United States Patent
Chen et al.

(10) Patent No.: US 11,533,184 B2
(45) Date of Patent: Dec. 20, 2022

(54) METHOD AND APPARATUS FOR ONLINE AND OFFLINE GENERATION OF UNIQUE DIGITAL CERTIFICATES

(71) Applicant: ARRIS Enterprises LLC, Suwanee, GA (US)

(72) Inventors: Ying Chen, San Diego, CA (US); Jinsong Zheng, San Diego, CA (US); Oscar Jiang, Rosemead, CA (US); Xin Qiu, San Diego, CA (US); Ting Yao, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 443 days.

(21) Appl. No.: 16/260,724

(22) Filed: Jan. 29, 2019

(65) Prior Publication Data

US 2019/0245701 A1  Aug. 8, 2019

Related U.S. Application Data

(60) Provisional application No. 62/623,346, filed on Jan. 29, 2018.

(51) Int. Cl.
| | | |
|---|---|---|
| *H04L 29/06* | (2006.01) | |
| *H04L 9/32* | (2006.01) | |
| *H04L 9/30* | (2006.01) | |
| *H04L 9/14* | (2006.01) | |
| *H04L 9/08* | (2006.01) | |

(52) U.S. Cl.
CPC .......... *H04L 9/3268* (2013.01); *H04L 9/0825* (2013.01); *H04L 9/14* (2013.01); *H04L 9/30* (2013.01); *H04L 9/3236* (2013.01); *H04L 9/3242* (2013.01); *H04L 9/3247* (2013.01)

(58) Field of Classification Search
CPC ... H04L 9/0825; H04L 9/3268; H04L 9/3236; H04L 9/14; H04L 9/3247; H04L 9/3242; H04L 9/30
See application file for complete search history.

(56) References Cited

U.S. PATENT DOCUMENTS

| | | | | |
|---|---|---|---|---|
| 7,263,608 | B2* | 8/2007 | Challener | G06F 21/57 713/156 |
| 10,454,689 | B1* | 10/2019 | Sharifi Mehr | H04L 63/166 |
| 2003/0115468 | A1* | 6/2003 | Aull | H04L 9/0825 713/175 |
| 2005/0149733 | A1* | 7/2005 | Catherman | G06F 21/602 713/175 |
| 2009/0083539 | A1* | 3/2009 | Catherman | G06F 21/57 713/156 |
| 2010/0131769 | A1* | 5/2010 | Homma | G06Q 10/08 713/176 |
| 2014/0165147 | A1* | 6/2014 | Hershberg | H04L 63/0823 726/4 |
| 2016/0358185 | A1* | 12/2016 | Zhang | G06Q 30/06 |

* cited by examiner

*Primary Examiner* — Harunur Rashid
(74) *Attorney, Agent, or Firm* — Chernoff, Vilhauer, McClung & Stenzel, LLP

(57) ABSTRACT

A system for generating unique digital certificates is provided that generates computed hashes public keys and compares them. The system method computes a hash of a public key, compares the computed hash of the public key with hashes of public keys previously generated, generates the digital certificate having the public key and a device identifier only if the computed hash of the public key does not match any of the hashes of public keys previously generated, and provides the digital certificate.

18 Claims, 5 Drawing Sheets

METHOD AND APPARATUS FOR ONLINE AND OFFLINE GENERATION OF UNIQUE DIGITAL CERTIFICATES

CROSS-REFERENCE TO RELATED APPLICATIONS

This application claims benefit of U.S. Provisional Patent Application No. 62/623,346, entitled "METHOD OF GUARANTEEING UNIQUENESS OF KEY AND CERTIFICATE IN A CA SYSTEM THAT HAVE BETWEEN BOTH ONLINE AND OFFLINE GENERATION COMPONENTS," by Ying Chen, Jinsong Zheng, Oscar Jiang, Xin Qiu, and Ting Yao, filed Jan. 29, 2018, which application is hereby incorporated by reference herein.

BACKGROUND

1. Field of the Invention

The present invention relates to systems and methods for generating digital certificates, and in particular to a system and method for generating digital certificates having guaranteed uniqueness.

2. Description of the Related Art

Public key cryptography provides a means where information can be securely exchanged between parties without requiring a secret shared between the parties, and to reliably verify the identity of an entity via cryptographic key pairs and digital signatures granted by a certification authority (CA).

One exemplary CA is PKIWorks, of the ARRIS CORPORATION, which, generates digital certificates in response to user requests such as those from device manufacturers and Telco operators.

A cryptographic key pair consists of a public key and a private key, and certificate is composed of the public key and other identity information such as a Media Access Control (MAC) address, International Mobile Equipment Identity (IMEI) and/or serial number reflecting the identity of the device for which the digital certificate is issued.

Based on the customer's needs, the key pairs and certificates may be generated in an online environment or an offline environment. The offline generation of keypairs and certificates offers they key pairs and certificates to be generated in a more secure computing environment, isolated from other processing elements and any networks, particularly the Internet.

Generating key pairs and certificates in both on-line and off-line environments while guaranteeing the uniqueness of keys generated in those environments and received from external parties presents challenges to the CA. What is needed is a system and method for generating digital certificates with unique keys that answers such challenges.

SUMMARY

To address the requirements described above, the present invention discloses a method and apparatus for generating a digital certificate. The method comprises computing a hash of a public key, comparing the computed hash of the public key with hashes of public keys previously generated, generating the digital certificate having the public key and a device identifier only if the computed hash of the public key does not match any of the hashes of public keys previously generated, and providing the digital certificate. A related embodiment is evidenced by a processor communicatively coupled to a memory storing processor instructions for performing the foregoing operations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized, and structural changes may be made without departing from the scope of the present invention.

Figure 1:
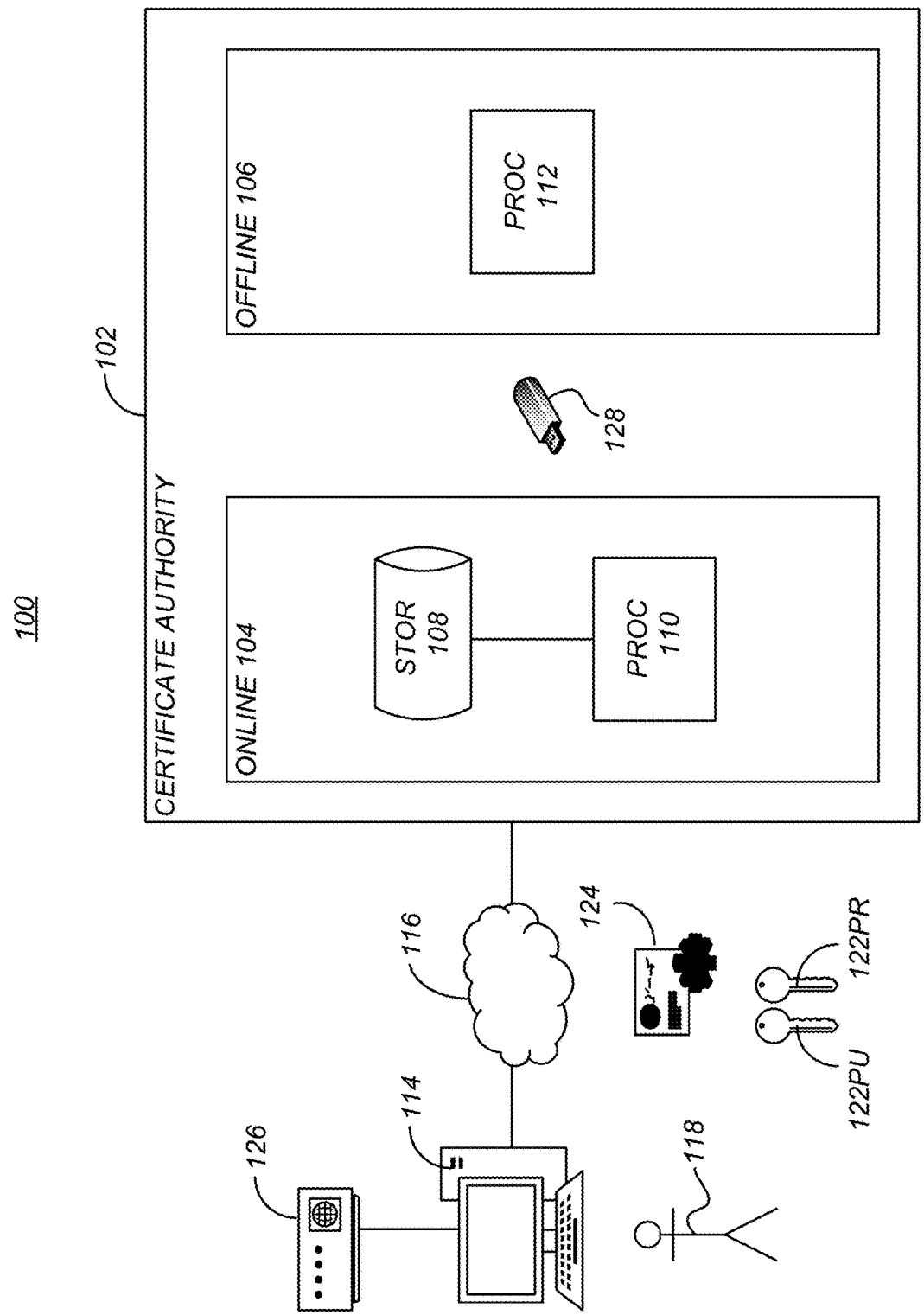
FIG. 1 is a diagram depicting a diagram of a system for providing digital certificates.

FIG. 1 is a diagram depicting a diagram of a system 100 for providing digital certificates. The system 100 comprises a certificate authority (CA) 102, having a processor 110 and communicatively coupled storage 108, which responds to certificate requests from users 118 submitted by user processing devices 114. Typically, the requests for digital certificates are provided via a public network 116 such as the Internet and the resulting digital certificates and key pairs are provided by the same communication path.

As described above, the CA 102 may comprise an online system 104 and an offline system 106. The processing and/or storage of data on the offline system 106 is isolated from the online system 104, and is typically performed in a secure facility using processor 112. This provides an additional level of security for high value assets.

The user 118 submits a request to the CA 102 for a digital certificate to be prepared by the online system 104 via processing device 114 and public network 116.

In a first case, the user's processing device 114 has already generated a key pair 122 comprising a private key 122PR and a public key 122PU. In this case, the request comprises the user-generated public key 122PU and identifies the device(s) 126 for which the certificate is requested. In one embodiment, device IDs are provided as a part of the request itself, but in other embodiments, the device IDs are stored in the CA 102 and request provides some indication identifying the devices of interest, for example, by specifying a range of device IDs, production dates or model numbers. In this case, the online 104 system generates the digital certificate 124 from the public key 122PU and the device IDs, and transmits the digital certificate 124 to processing device 114, via public network 116.

In a second case, processing device 114 has not generated the key pair 122, and the request ask that the CA generate the public key 122PU and the private key 122PR. In this case, the request also identifies the devices for which the digital certificated is requested, and a paradigm by which the private key 122PR will be encrypted by the CA 102 before transmission to the processing device 114. In a first subcase, the request specifies that the key pair 122 and digital certificate 124 be generated by the online 104 system, and in a second subcase, the request specifies that the key pair 122 and digital certificate 124 be generated by the offline system 106.

In the first subcase, the online system 104 generates the key pair 122 and the digital certificate 124, and transmits them to processing device 114. In the second subcase, the request is received in the online system 104, and conveyed to the offline system 106 in a secure way. In one embodiment, the request is conveyed via what is known as "sneaker net", in which the request is stored on a portable token 128 and physically conveyed from the online system 104 to the offline system 106, where the key pair 122 comprising the public key 122PU, the private key 122PR are generated and the digital certificate 124 is generated from the device ID and the public key 122PU. The generated digital certificate 124 with the public key 122PU and an encrypted version of the private key 122PR is conveyed from the offline system 106 to the online system 104, and from the online system 104 to the processing device 114, where the encrypted private key 122PR can be decrypted using the protection paradigm specified in the digital certificate request.

A key pair 122 generated by the online system 104 cannot be a duplicate of any existing key pairs 122 previously generated, including those key pairs 122 generated by the online system 104 and offline system 106. Therefore, if a key pair 122 generated by the online system 104 is not unique, the key pair 122 is discarded, and the digital certificate 124 is not generated using the public key 122PU.

Further, a key pair 122 generated by the offline system 106 cannot have duplication among all the key pairs 122 generated by both the online system 104 and offline system 106. If a key pair 122 generated by the offline system 106 is not unique when checked offline 106, the key pair 122 is discarded and the digital certificate 124 is not generated. But when a key pair 122 generated by the offline system 106 is not unique when checked by the online system 104, the key pair 122 is abandoned along with its corresponding digital certificate 124. If the device ID associated with the abandoned digital certificate 124 cannot be skipped, then a new key pair 122 and digital certificate 124 must be generated for this device ID by the offline system 106.

As described above, the ordering information for offline generation from the request is transported to offline system via portable storage device 128 such as USB flash drive. Similarly, the generated key pairs 122 and certificates 124 for the order also need to be transferred from offline to online. The transportation of any data via a portable device 128 must be secure and temper-proof between systems 104, 106.

Each private key generated offline is paired with a certificate. The known method to validate the certificate and private key are indeed a pair requires that the private key be clear and unencrypted. However, the private key is typically immediately encrypted after it is generated and remains encrypted during transport from the offline system 106 to the online system 104. How to verify that the encrypted private key 122PR and the digital certificate 124 are a pair is a challenge.

Overview

Discussed below is a system and method that provides a solution to the aforementioned challenges. In summary, the system and method operate as follows.

In the first subcase wherein the key pair 122 is generated by the online system 104, immediately after a key pair 122 is generated by online system 104, a hash of the public key 122PU is calculated, and the hash is compared with the hashes of previously generated or received public keys. Such hashes are stored, for example, in storage 108. If a matching hash is found, the key pair 122 associated with the hash is abandoned and a certificate 124 is not generated for this key pair 122. If a matching hash is not found, the key pair 122 is retained. The private key 122PR is encrypted, and a certificate 124 is generated for this key pair 122. The certificate 124, which has the public key 122PU, encrypted private key 122PR and hash of the public key 122PU are stored in system storage 108.

In the second subcase wherein the key pair 122 is generated by the offline system 106, the request typically comprises a request for a plurality (e.g. batch) of digital certificates 124 for a plurality of devices 126. In this subcase, immediately after a key pair 122 is generated by the offline system 106, a hash of the public key $K_{pu}$ is calculated, and the hash is compared with the hashes of the public keys 122PU just generated in the same batch. If a matching hash is found, the key pair 122 is abandoned and no certificate 124 is generated for this key pair 122. If a matching hash is not found, the private key 122PR of the key pair 122 is encrypted, and a certificate 124 is generated for this key pair 122. After entire batch of key pairs 122 and certificates 124 are generated by the offline system 106, the hashes of all public keys 122PU, encrypted private keys 122PR and certificates 124 are brought online. The hashes of each public key 122PU of the batch of public keys 122PU are compared with the stored public key 122PU hashes. If matching hash is found among the stored public key 122PU hashes, the encrypted private key 122PR and certificate 124 for the key pair 122 are abandoned. If the device ID in the certificate 124 cannot be skipped, the device ID is marked to indicate that the certificate for that device ID must be regenerated by the offline system 106. Otherwise the encrypted private key 122PR, certificate 124 for the key pair 122, and the hash of the public key 122PU are stored in the system storage 108.

When an order is downloaded from the online environment 104 to be transported to the offline environment 106, the ordering information such as device IDs, the type of key pair 122 and the protection mechanism of the private key 122PR is recorded in a file. A digital signature is generated for the file to prevent tempering during transport. When the offline generation process begins, this signature is used to verify the order information in the file is not being modified or tampered during the transport from the online system to the offline system.

Further, when generated key pairs 122 and certificates 124 are downloaded from offline environment 106 to be transported to the online environment 104, the generated data information such as device ID, its associated encrypted private key 122PR and certificate 124 is recorded in a file, and a digital signature is generated for this file. Before the encrypted private key 122PR and certificates 124 are loaded online, this signature is used to verify to make sure the file is not modified during the transport from the offline system 106 to the online system 104.

During offline generation of the key pair 122, right after a private key 122PR is generated, the private key 122PR is encrypted according to the specified protection paradigm, and the encrypted private key 122PR is signed with the clear private key 122PR. The encrypted private key 122PR, signature and certificate 124 are then conveyed from the offline system 106 to the online system 104. During the process of loading generated data to online system 104, the signature for the encrypted private key 122PR is verified using the public key 122PU in the certificate 124 to ensure the encrypted private key 122PR indeed matches the certificate 124.

Figure 2:
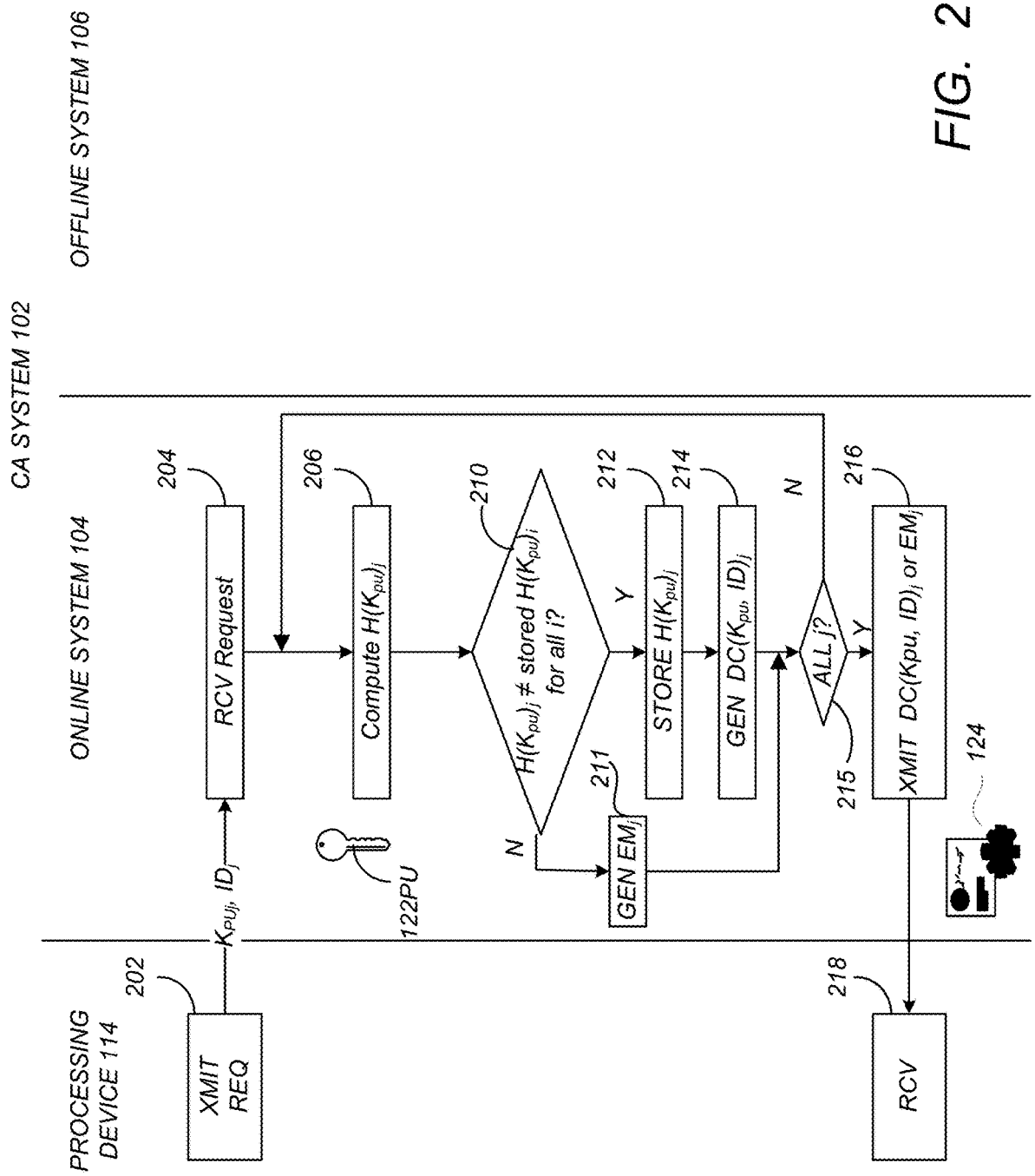
FIG. 2 is a diagram illustrating one embodiment of a method for generating a digital certificate.

FIG. 2 is a diagram illustrating one embodiment of a method for generating a digital certificate 124. This embodiment refers to the first case described above, wherein the processing device 114 has computed the key pair(s) 122, and provides the computed public key $K_{puj}$ 122 PU to the CA system 102 to generate a certificate. The process beings when the processing device 114 contacts the CA system 102 and transmits a message requesting the generation of the digital certificate 124, as shown in block 202. In one embodiment, the request includes one or more the public keys $K_{puj}$ 122PU and associated device identifiers ($ID_j$). In another embodiment, the request comprises one or more public keys $K_{pu}$ 122PU and an indication of the devices for which digital certificates 124 are requested (for example, by a range of serial numbers, product manufacture dates, or model numbers), and the online system 104 uses this information to retrieve and use the associated device IDs. In block 204, the request is received in the online system 104. In block 206, a hash of a public key $K_{puj}$ 122PU is computed (hereinafter $H(K_{pu})_j$), thus producing a digest. In one embodiment, the hash is generated by a cryptographic hash function such as a secure hash algorithm, for example, SHA-1, SHA-2, or SHA-3.

Block 210 compares the computed hash of the public key $K_{puj}$ 122PU with the stored has of every public key previously generated or received $H(K_{pu})_i$. If the computed hash of the public key $H(K_{pu})_j$ matches any of the stored hashes of the public keys that were previously generated or received, $H(K_{pu})_i$, block 210 routes processing to block 211, which generates an error message $EM_j$ indicating that public key $K_{puj}$ 122PU is the same as one that was previously generated or received and a different public key should be used for $ID_j$.

If the computed hash of the public key $H(K_{pu})_j$ does not match any of the stored hashes of the public keys that were previously generated or received, $H(K_{pu})_i$, block 210 routes processing to block 212, which stores the newly generated hash of the public key $H(K_{pu})_j$ in storage 108 of the online system 104. Then, in block 214, a digital certificate is generated for the provided public key $K_{puj}$ 122PU and device $ID_j$. Block 215 checks whether all the $K_{puj}$ 122PU and $ID_j$ in the request from the processing device 114 have been processed. If no, the operations of blocks 206-215 is repeated for the next $K_{puj}$ 122PU and $ID_j$. Otherwise, the digital certificate $DC(K_{pu}, ID)_j$ 124, or the error message $EM_j$ is then transmitted from the online system 104, as shown in block 216, and received by the processing device 114, where the digital certificate $DC(K_{pu}, ID)_j$ 124 may be provided to each device 126 as required, as shown in block 218.

Figure 3:
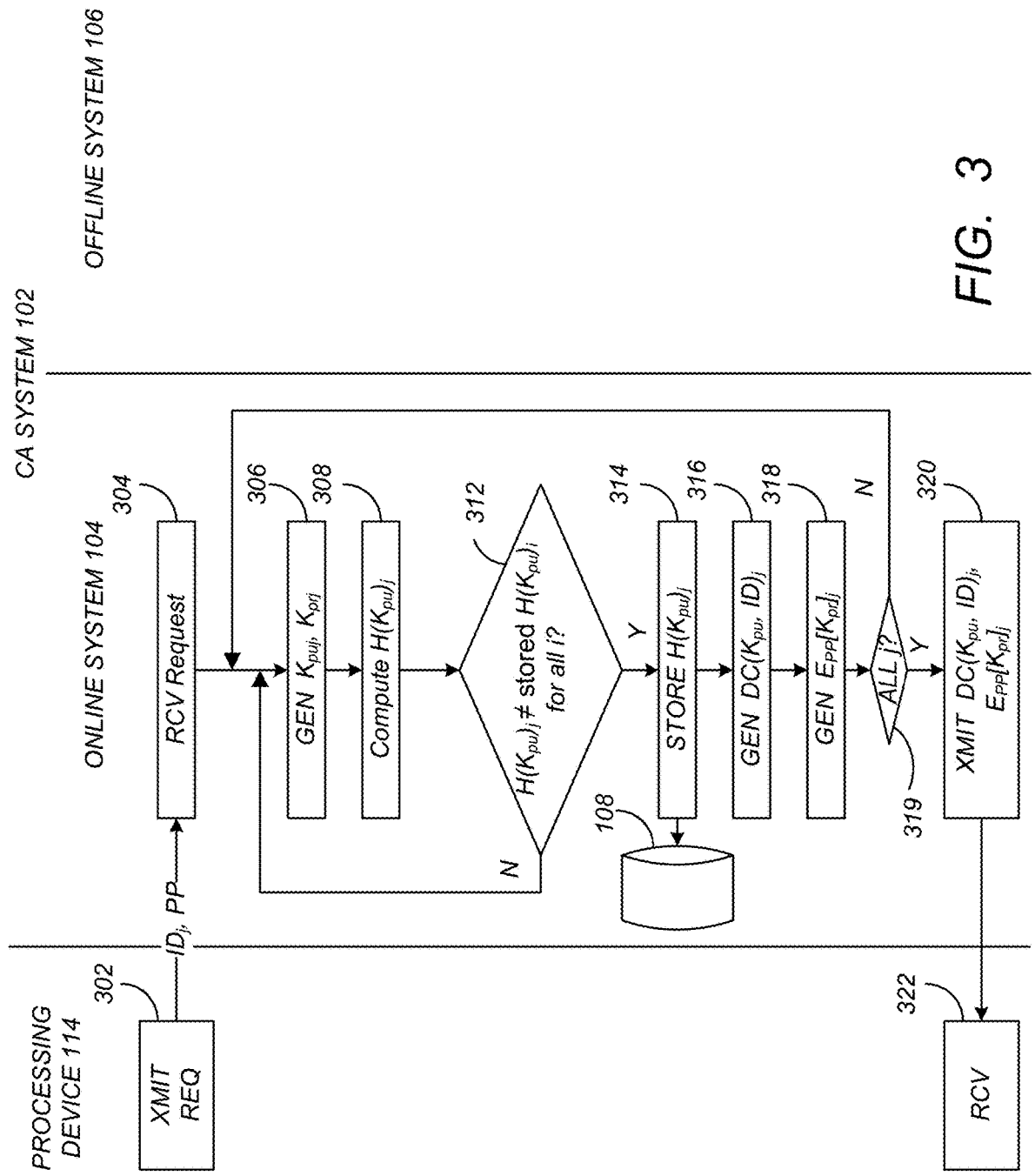
FIG. 3 is a diagram of another embodiment of a method for generating a digital certificate.

FIG. 3 is a diagram of another embodiment of a method for generating a digital certificate 124. This embodiment refers to the first subcase of the second case described above, wherein the processing device 114 has not computed the key pair(s) 122. In block 302, the processing device 114 contacts the CA system 102 and transmits information requesting the generation of the digital certificate 124. As the processing device 114 has not generated the key pair 122 required for generating the digital certificate 124, this task is assigned instead to the CA system 102. In one embodiment the request comprises the device ID(s) of the devices for which a digital certificate is desired, and an indication of a protection paradigm (PP) that must be used when the CA system 102 transmits the private key 122PR to the processing device 114. In other embodiments, the device ID may be inferred from other information as described above, and the protection paradigm is assumed, or negotiated in advance, and is not required in the request. Exemplary protection paradigms include, for example, indicating that the private key is to be encrypted according to a shared secret, encrypted according to the public key of a key pair previously exchanged between the processing device 114 and the CA system 102, or other paradigms.

In block 304, the CA system 102 receives the request, and in block 306, generates a key pair 122 for $ID_j$ including a private key $K_{prj}$ 122PR and a public key $K_{puj}$ 122PU, as shown in block 306. A hash of the public key $K_{puj}$ 122PU ($H(K_{pu})_j$) is then computed, as shown in block 308.

Block 312 compares the computed hash of the currently generated public key $K_{puj}$ 122PU, $H(K_{pu})_j$, with all the stored hashes of the public keys previously generated or received $H(K_{pu})_i$. If the computed hash of the public key $H(K_{pu})_j$ matches any of the stored hashes of the public keys that were previously generated or received, $H(K_{pu})_i$, block 312 routes processing to block 306, which generates another key pair 122 including another private key $K_{prj}$ 122PR and another public key $K_{puj}$ 122PU, as shown in block 306. The processing of blocks 308-312 is then repeated for the newly generated key pair 122.

Of course, the public keys $K_{puj}$ 122 PU themselves could be checked to determine if there are any collisions with previously generated or received public keys $K_{puj}$ 122 PU. However, hashes offer a more lightweight data structure for such checks, and are globally unique to each public key. Accordingly, the time required to generate the hash of each public key $K_{puj}$ 122 PU for later comparison to other hashes of public keys $K_{puj}$ 122 PU is more than offset by the savings in processing time and memory when checking for collisions of hashes.

If the computed hash of the currently generated public key $K_{puj}$ 122PU does not match any of the stored hashes of the public keys that were previously generated or received, $H(K_{pu})_i$, block 312 routes processing to block 314, which stores the hash of the currently generated public key $K_{puj}$ 122PU, $H(K_{pu})_j$, in storage 108 of the online system 104. Then, a digital certificate 124 is generated, as shown in block 316. The generated private key $K_{prj}$ 122PR is then encrypted according to the protection paradigm PP to produce $E_{PP}[K_{pr}]_j$, as shown in block 318. Block 319 checks whether all the $ID_j$ in the request from the processing device 114 have been processed. If no, the operations of block 306-319 are repeated for the next $ID_j$. Otherwise, block 320 transmits the generated digital certificate $DC(K_{pu}, ID)_j$ 124 and the encrypted private key $E_{PP}[K_{pr}]_j$ from the online system 104 to the processing device 114. The processing device 114 receives the generated digital certificate $DC(K_{pu}, ID)_j$ 124 and the encrypted private key $E_{PP}[K_{pr}]_j$, as shown in block 322. As shown in FIG. 3, the operations of blocks 304-320 are performed in the online environment or system 104 of the CA system 102.

Figure 4:
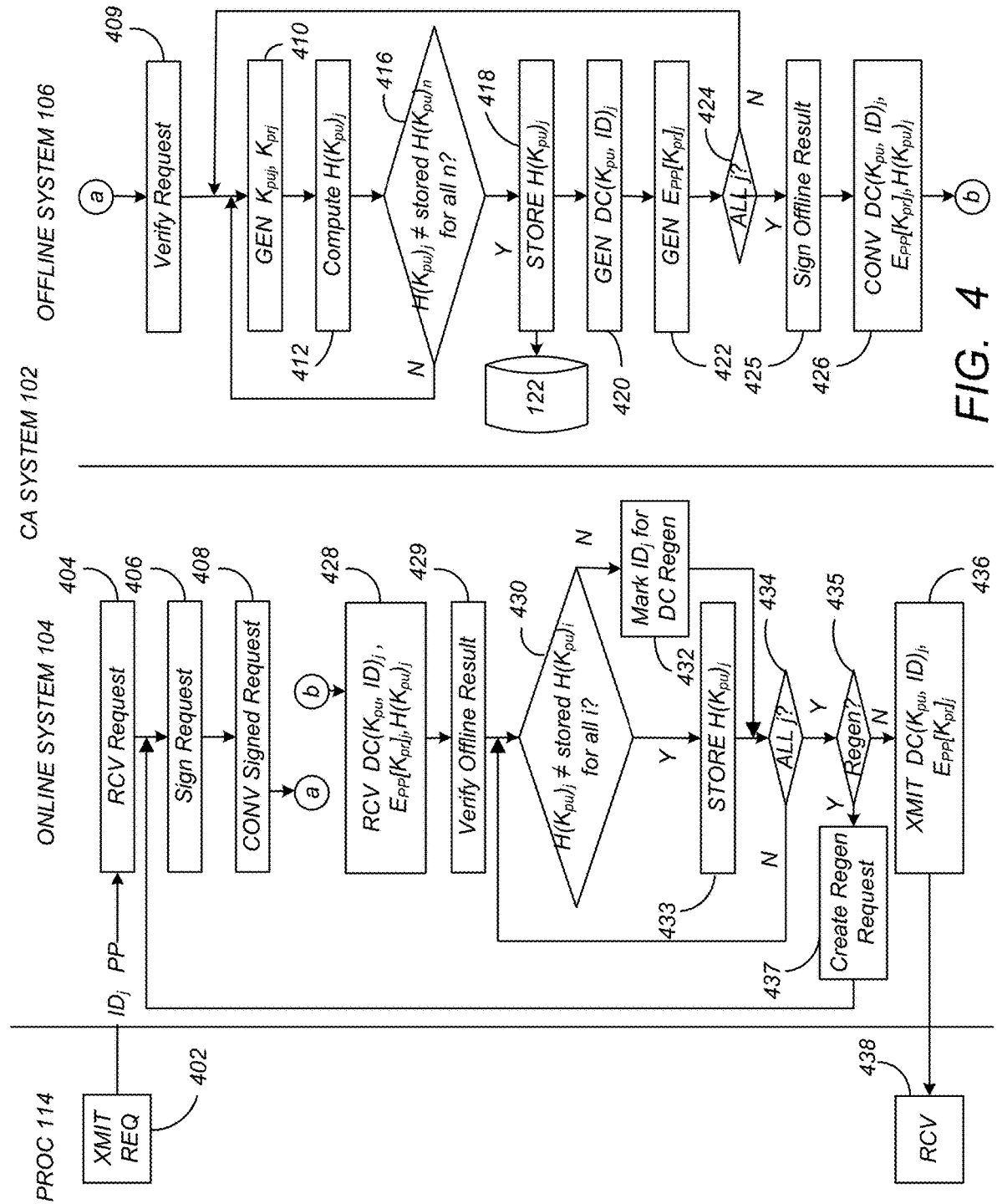
FIG. 4 is a diagram of another embodiment of a method for generating a digital certificate.

FIG. 4 is a diagram of another embodiment of a method for generating a digital certificate 124. This embodiment refers to the second subcase of the second case described above, wherein the processing device contacts the CA system 102 and transmits information requesting the generation of the digital certificate(s) 124. In block 402, the processing device 114 contacts the CA system 102 and transmits information requesting the generation of the digital certificate(s) 124. Although a single certificate 124 may be requested, the request typically comprises a request for a plurality or batch of digital certificates, and encrypted private keys $K_{pr}$ 122PR.

As was true in the first subcase, in this second subcase, the processing device 114 has not generated the key pairs 122 required for generating the digital certificates, and the CA system 102 instead generates the key pairs 122. However, in this embodiment, the key pairs 122 and certificates 124 are generated by the offline system 106 of the CA system 102. As with the first subcase, the request may comprise the device ID(s) of the devices for which a digital certificates are desired, and an indication of a protection paradigm (PP) that must be used when the CA system 102 transmits the private keys 122PR to the processing device 114, but the device IDs may be inferred from other information as described above, and the protection paradigm is assumed, or negotiated in advance, and is not required in the request.

In block 404, the CA system 102 receives the request. The request is ultimately to be conveyed to the offline system 106, and to assure that the request is not compromised in transit, the online system 104 signs the request as shown in block 406 before the request is conveyed to the offline system 106. Typically, the request is conveyed from the online system 104 to the offline system 106 by physical transportation of a physically portable memory 128 from the online system 104 to the offline system 106, as shown in block 408.

Block 409 verifies the signature of the request conveyed from the online system 104 to ensure the request is not compromised. Block 410 generates a key pair 122 for an $ID_j$ including a private key $K_{prj}$ 122PR and a public key $K_{puj}$ 122PU. A hash of the public key $K_{puj}$ 122PU, $H(K_{pu})_j$, is then computed, as shown in block 412.

Block 416 compares the computed hash of the currently generated public key $K_{puj}$ 122PU, $H(K_{pu})_j$, with all the hashes of the public keys already generated by the offline system for the same request, $H(K_{pu})_n$. If the computed hash of the public key $H(K_{pu})_j$ matches any of the hashes of the public keys already generated by the offline system for the same request, $H(K_{pu})_n$, block 416 routes processing to block 410, which generates another key pair 122 including another private key $K_{prj}$ 122PR and another public key $K_{puj}$ 122PU. The processing of blocks 410-416 is then repeated for the newly generated key pair 122.

If the computed hash of the currently generated public key $K_{puj}$ 122PU does not match any of the hashes of the public keys already generated by the offline system for the same request, $H(K_{pu})_n$, block 416 routes processing to block 418, which stores the hash of the currently generated public key $K_{puj}$ 122PU in storage of the offline system 106. Such storage can be the hardware memory 128 or other storage local to the offline system. A digital certificate $DC(K_{pr}, ID)_j$ 124 is then generated for the generated key pair 122, as shown in block 420. The generated private key $K_{prj}$ is then encrypted according to the protection paradigm PP to produce $E_{PP}[K_{pr}]_j$, as shown in block 422. To protect the conveyance of the private keys $K_{pr}$ 122PR from the offline system 104 to the online system 104 and assure it is not compromised, in one embodiment, each encrypted private keys $E_{PP}[K_{pr}]_j$ is signed by the associated private key $K_{prj}$ 122PR, in block 422. Block 424 determines if all of the requested batch of key pairs 122 and certificates 124 have been generated. If not, processing is routed to block 410 to generate another key pair 122 and certificate 124. If all of the requested batch of requested key pairs 122 and certificates 124 have been generated, processing is routed to block 425, which signs the entire processing result of the offline system 106. Block 426 conveys to the online system 104 the signed processing result of the offline system 106, which includes the generated digital certificates $DC(K_{pu}, ID)_j$ 124, associated encrypted private keys $E_{PP}[K_{pr}]_j$, and hashes of the public keys $H(K_{pu})_j$. As described above, this is typically performed by physical transfer of a memory device 128 from the offline system 106 to the online system 104.

In block 428, the online system 104 receives the conveyed generated digital certificates 124, associated encrypted private keys $K_{pr}$ 122PR, and hashes of the public keys $K_{pu}$ 122PU. Block 429 verifies the signature of the entire processing result from the offline system 106. If the encrypted private keys $E_{PP}[K_{pr}]$ 122PK are signed by the associated private key $K_{pr}$ 122PR before being conveyed to the online system 104, the encrypted private keys are validated using the public key $K_{pu}$ 122PU of the associated digital certificate 124, also in block 429.

As the conveyance of the request, the generation of key pairs 122 and certificates 124 by the offline system 106, and conveyance of the resulting digital certificates 124 and associated information requires time, it is possible that in the interim, the online system 104 may have generated one or more key pairs 122 and certificates 124 having the same key pair 122 values. Accordingly, the online system 104 must check to assure that none of the key pairs 122 generated by the offline system 106 match and hence collide with any of the key pairs 122 generated by the online system. The private key has been encrypted before transmission by a protection paradigm PP and cannot be decrypted by the online system, but the public keys $K_{pu}$ 122PU are not encrypted, and the hashes of the public keys $K_{pu}$ 122 PU generated by the offline system 106 are conveyed and hence available for inspection. The hashes of those public keys $K_{pu}$ 122 PU can be inspected to determine if there are any collisions between the public keys generated by the offline system and all the public keys previously generated, by the online system and the offline system, or received from external parties. Accordingly, processing is routed to block 430, which checks to determine if any of the hashes of the public keys $K_{pu}$ 122 PU in the processing result received from the offline system 106 matches any of the stored hashes of public keys $K_{pu}$ 122 PU previously generated or received by the CA system 102. If a match between the hash of the public key for $ID_j$, $H(K_{pu})_j$, and the hash of a public key previously generated or received by the CA system 102, $H(K_{pu})_i$, is discovered, the digital certificate $DC(K_{pu}, ID)_j$ 124 generated by the offline system 106 must be regenerated. Hence, processing is thereby routed to block 432, which marks the ID of the associated certificate $DC(K_{pu}, ID)_j$ 124 for regeneration. If no match is found, processing is routed to block 433, which stores the hash of the public key received from the offline system 106, $H(K_{pu})_j$, in storage 108 of the online system 104. Block 434 checks if all the hashes of public keys received from the offline system 106 have been checked for collision. If no, operations in blocks 430-434 are repeated for the next hash received from the offline system 106. Otherwise, processing is routed to block 435, which checks if there is any ID marked for regeneration. If yes, the IDs marked for regeneration and other required information associated with these digital certificates 124 are packaged in a new request, as shown in block 437, and conveyed to the offline system 106 so that the digital certificates 124 can be regenerated using the process steps outlined above. With a certificate generation request from processing device 114 for an extremely large number of IDs, it is possible that regeneration could be done more than once before no more ID is marked for regeneration.

When no more ID is marked for regeneration, the digital certificates 124 and encrypted private keys are transmitted to the processing device 114, as shown in block 436 where they are received, as shown in block 438, and optionally provided to devices 126.

Hardware Environment

Figure 5:
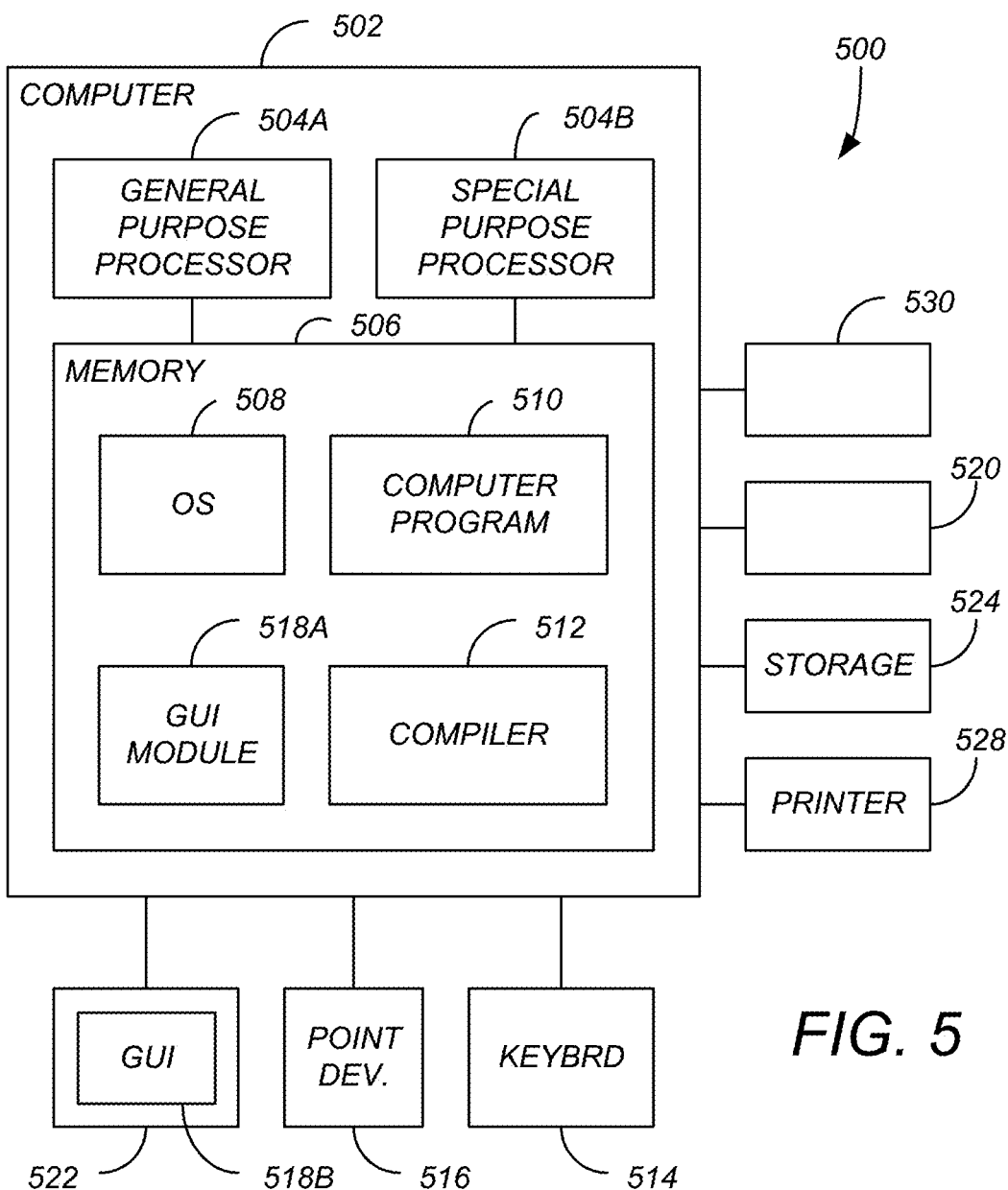
FIG. 5 is a diagram illustrating an exemplary computer system that could be used to implement elements of the system.

FIG. 5 is a diagram illustrating an exemplary computer system 500 that could be used to implement elements of the system 100 and method, including devices 126, processing device 114, online system 104 and offline system 106. The computer 502 comprises a general purpose hardware processor 504A and/or a special purpose hardware processor 504B (hereinafter alternatively collectively referred to as processor 504) and a memory 506, such as random access memory (RAM). The computer 502 may be coupled to other devices, including input/output (I/O) devices such as a keyboard 514, a mouse device 516 and a printer 528.

In one embodiment, the computer 502 operates by the general purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508 to provide output and results.

Output/results may be presented on the display 522 or provided to another device for presentation or further processing or action. In one embodiment, the display 522 comprises a liquid crystal display (LCD) having a plurality of separately addressable pixels formed by liquid crystals. Each pixel of the display 522 changes to an opaque or translucent state to form a part of the image on the display in response to the data or information generated by the processor 504 from the application of the instructions of the computer program 510 and/or operating system 508 to the input and commands. Other display 522 types also include picture elements that change state in order to create the image presented on the display 522. The image may be provided through a graphical user interface (GUI) module 518A. Although the GUI module 518A is depicted as a separate module, the instructions performing the GUI functions can be resident or distributed in the operating system 508, the computer program 510, or implemented with special purpose memory and processors.

Some or all of the operations performed by the computer 502 according to the computer program 510 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 502 may also implement a compiler 512 which allows an application program 510 written in a programming language such as COBOL, C++, FORTRAN, or other language to be translated into processor 504 readable code. After completion, the application or computer program 510 accesses and manipulates data accepted from I/O devices and stored in the memory 506 of the computer 502 using the relationships and logic that was generated using the compiler 512.

The computer 502 also optionally comprises an external communication device such as a modem, satellite link, Ethernet card, or other device for accepting input from and providing output to other computers.

In one embodiment, instructions implementing the operating system 508, the computer program 510, and/or the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, or a flash drive. Further, the operating system 508 and the computer program 510 are comprised of computer program instructions which, when accessed, read and executed by the computer 502, causes the computer 502 to perform the steps necessary to implement and/or use the present invention or to load the program of instructions into a memory, thus creating a special purpose data structure causing the computer to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 502.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. A method of generating a digital certificate, comprising:
computing a hash of a public key;
comparing the computed hash of the public key with hashes of public keys previously generated;

generating the digital certificate having the public key and a device identifier only if the computed hash of the public key does not match any of the hashes of public keys previously generated; and providing the digital certificate.

2. The method of claim 1, further comprising accepting a request to generate the digital certificate, the request comprising a public key.

3. The method of claim 1, wherein the method further comprises:
- accepting a request to generate a key pair and the digital certificate, the key pair comprising the public key and a private key;
- generating the private key and the public key;
- encrypting the private key; and where
- providing the digital certificate comprises transmitting the encrypted private key and the digital certificate.

4. The method of claim 3, wherein the request further comprises a protection paradigm for the private key and the private key is encrypted according to the protection paradigm.

5. The method of claim 1, wherein the method further comprises:
- (a) accepting, in a first system of a certificate authority having the first system and a second system, a request to generate a key pair and an associated digital certificate, the key pair comprising the public key and a private key, the request comprising a protection paradigm for the private key;
- (b) conveying the request to the second system;
- (c) generating, with the second system, the key pair comprising the private key and the public key;
- (d) computing, with the second system, the hash of the public key;
- (e) comparing, with the second system, the computed hash of the public key with hashes of public keys previously generated by the second system in response to the request;
- if the computed hash of the public key matches a hash of a public key of any key pair previously generated by the second system in response to the request, performing steps (c)-(f) to generate another key pair having another private key and another public key; and
- (g) if the computed hash of the public key does not match the hash of the public key of any key pair previously generated by the second system in response to the request:
  - generating, with the second system, the digital certificate having the public key and a device identifier;
  - encrypting, with the second system, the private key according to the protection paradigm;
  - conveying the digital certificate, the encrypted private key, and the computed hash of the public key from the first system to the second system;
  - comparing, with the first system, the computed hash of the public key with hashes of public keys previously generated by the first system and if the computed hash of the public key matches a hash of a public key of any key pair previously generated by the first system abandoning the digital certificate and performing steps (c)-(g) for another key pair and another digital certificate and where if the computed hash of the public key does not match a hash of a public key of any key pair previously generated by the first system, transmitting, with the first system, the digital certificate, the public key, and the encrypted private key.

6. The method of claim 5, wherein conveying the digital certificate and the encrypted private key from the first system to the second system comprises:
- signing the encrypted private key with the private key;
- conveying the encrypted private key, the signed encrypted private key and the digital certificate to the first system; and
- verifying the signed encrypted private key using the public key of the digital certificate.

7. The method of claim 6, wherein conveying the request to the second system comprises:
- generating, in the first system a file having the device identifier and the protection paradigm for the private key;
- signing the file in the first system; and
- verifying the signature of the file in the second system.

8. The method of claim 5, wherein the second system is processingly isolated from the first system.

9. The method of claim 8, wherein the first system is an online system and the second system is an offline system.

10. An apparatus for generating a digital certificate, comprising:
- at least one processor;
- at least one memory, communicatively coupled to the processor, the memory storing processor instructions comprising instructions for
  - computing a hash of a public key;
  - comparing the computed hash of the public key with hashes of public keys previously generated;
- generating the digital certificate having the public key and a device identifier only if the computed hash of the public key does not match any of the hashes of public keys previously generated; and
- providing the digital certificate.

11. The apparatus of claim 10, wherein the processor instructions further comprise instructions for accepting a request to generate the digital certificate, the request comprising a public key.

12. The apparatus of claim 10, wherein the processor instructions further comprise processor instructions for:
- accepting a request to generate a key pair and the digital certificate, the key pair comprising the public key and a private key, the request comprising:
  - generating the private key and the public key;
  - encrypting the private key; where
- the processor instructions for providing the digital certificate comprise processor instructions for transmitting the encrypted private key and the digital certificate.

13. The apparatus of claim 12, wherein the request further comprises a protection paradigm for the private key; and the private key is encrypted according to the protection paradigm.

14. The apparatus of claim 10, further comprising a second processor communicatively coupled to a second memory, and wherein the processor instructions further comprise processor instructions for accepting a request in a first system to generate a key pair and an associated digital certificate, the key pair comprising the public key and a private key, the request comprising a protection paradigm for the private key where the request is conveyed to a second system, wherein the second system comprises a second processor communicatively coupled to a second memory comprising second processor instructions including processor instructions for:
- (a) generating the key pair comprising the private key and the public key;
- (b) computing the hash of the public key;

(c) comparing the computed hash of the public key with hashes of public keys previously generated by the second system in response to the request;

(d) if the computed hash of the public key matches a hash of a public key of any key pair previously generated by the second system in response to the request performing steps (a)-(d) to generate another key pair having another private key and another public key; and (e) if the computed hash of the public key does not match the hash of the public key of any key pair previously generated by the second system in response to the request, generating the digital certificate having the public key and a device identifier and encrypting the private key according to the protection paradigm;

(f) wherein the digital certificate, the encrypted private key, and the computed hash of the public key is conveyed from the first system to the second system and wherein the processor instructions further comprise instructions for:

comparing the computed hash of the public key with hashes of public keys previously generated by the first system;

abandoning the digital certificate providing the device identifier to the second system to perform steps (a)-(e) for another key pair and another digital certificate if the computed hash of the public key matches a hash of a public key of any key pair previously generated by the first system; and transmitting the digital certificate, the public key, and the encrypted private key if the computed hash of the public key does not match a hash of a public key of any key pair previously generated by the first system.

15. The apparatus of claim 14, wherein the second processor instructions further comprise instructions for, before the digital certificate and the encrypted private key is conveyed from the second system to the first system:

signing the encrypted private key with the private key;

conveying the encrypted private key, the signed encrypted private key and the digital certificate to the first system; and verifying the signed encrypted private key using the public key of the digital certificate.

16. The apparatus of claim 15, wherein the processor instructions further comprise instructions for, before the digital certificate and the encrypted private key is conveyed from the first system to the second system:

generating a file having the device identifier and the protection paradigm for the private key;

signing the file in the first system; and verifying the signature of the file in the second system.

17. The apparatus of claim 14, wherein the second system is processingly isolated from the first system.

18. The apparatus of claim 17, wherein the first system is an online system and the second system is an offline system.

* * * * *